No. 668,666. Patented Feb. 26, 1901.
M. WADDELL.
JUNCTION BOX FOR ELECTRIC LIGHTING SYSTEMS.
(Application filed Jan. 31, 1900.)
(No Model.) 2 Sheets—Sheet 1.

Witnesses:
D. W. Edelin.
M. B. Cole.

Inventor.
Montgomery Waddell,
by Pennie & Goldsborough,
Attys.

No. 668,666. Patented Feb. 26, 1901.
M. WADDELL.
JUNCTION BOX FOR ELECTRIC LIGHTING SYSTEMS.
(Application filed Jan. 31, 1900.)

(No Model.) 2 Sheets—Sheet 2.

Witnesses:
D. W. Edelin
M. B. Cole

Inventor:
Montgomery Waddell,
by Pennie & Goldsborough,
Attys.

UNITED STATES PATENT OFFICE.

MONTGOMERY WADDELL, OF NEW YORK, N. Y., ASSIGNOR TO THE ELECTRIC AXLE LIGHT AND POWER COMPANY, OF SAME PLACE.

JUNCTION-BOX FOR ELECTRIC-LIGHTING SYSTEMS.

SPECIFICATION forming part of Letters Patent No. 668,666, dated February 26, 1901.

Application filed January 31, 1900. Serial No. 3,485. (No model.)

*To all whom it may concern:*

Be it known that I, MONTGOMERY WADDELL, a subject of the Queen of Great Britain, residing at New York, in the county of New York and State of New York, have invented certain new and useful Improvements in Junction-Boxes for Electric-Lighting Systems; and I do hereby declare the following to be a full, clear, and exact description of the invention, such as will enable others skilled in the art to which it appertains to make and use the same.

My invention relates to certain new and useful improvements in junction-boxes for electric-lighting systems, particularly for those systems wherein secondary batteries are employed, as upon railway cars or trains, for supplying the lighting-circuits. In such systems the secondary batteries carried upon the car or train and adapted to be charged at intervals are preferably connected up in parallel when discharging into the lighting-circuit, which has the usual controlling-switchboard. It is desirable, however, to charge the batteries in series, and to this end my improved junction-box is provided with separate sets of terminals so related to each other that when the shiftable parts are in the charging position the batteries are in series and the switchboard entirely disconnected, whereas when the shiftable parts are in the discharging position the batteries are in parallel and the charging-terminals are entirely disconnected. This latter adjustment should of course be given to the parts by the operator at the conclusion of the charging operation, whereupon he closes the lid or cover of the junction-box, and in order to insure against carelessness on his part in this respect the construction is such that it is impossible for him to close the lid until he has made the adjustment referred to, the failure of the lid to close advising him at once of his oversight.

A further feature of the invention is that all of the terminals of the box may be entirely disconnected by bringing the parts into an intermediate or neutral adjustment.

Figure 1:
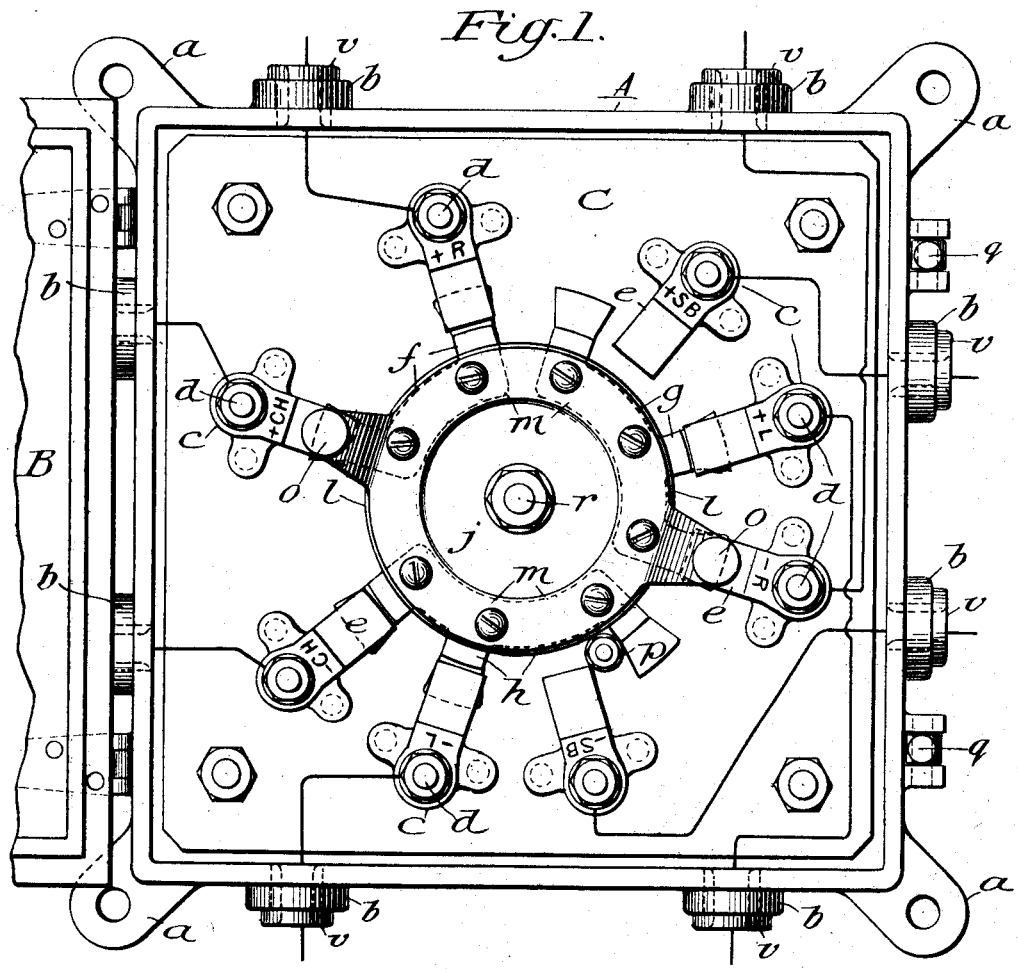
Figure 2:
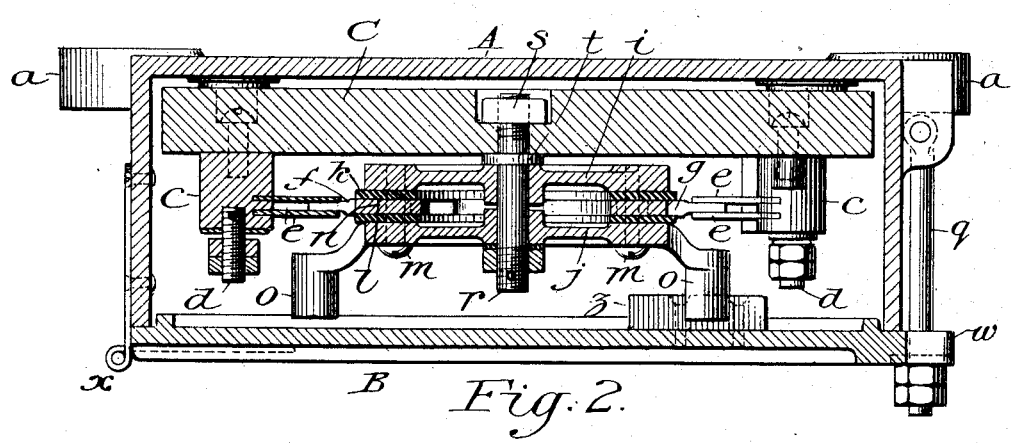
Figure 3:
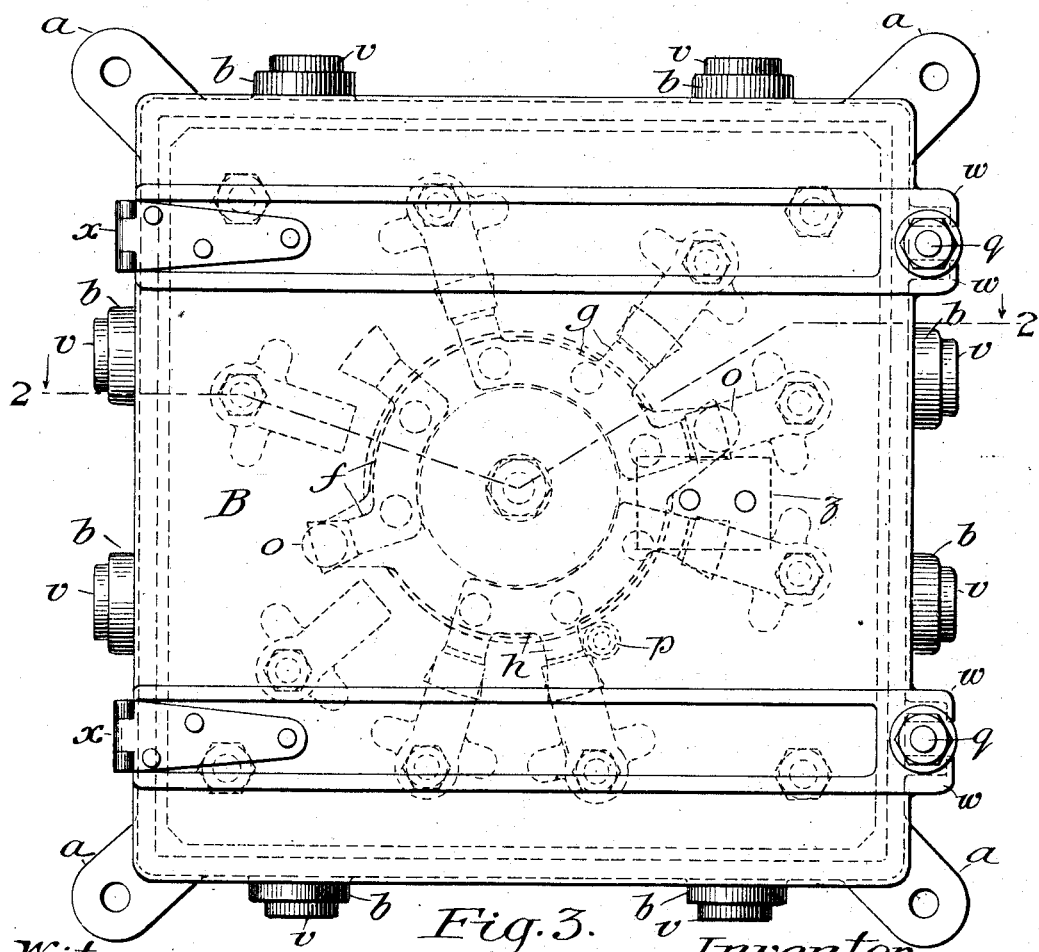

In the accompanying drawings, Figure 1 represents a bottom plan view of a junction-box embodying my invention, the cover being swung back to disclose the interior arrangement of parts and being shown as partly broken away. Fig. 2 represents a vertical section thereof on the line 2 2 of Fig. 3. Fig. 3 represents a bottom plan view with the cover closed, the inner parts being indicated in dotted lines.

Similar letters of reference indicate similar parts throughout the several views.

Referring to the drawings, A indicates the body portion of a box or casing, which may conveniently consist of a casting provided with perforated lugs *a* for attachment to the bottom of a car and with flanges or nipples *b*, having insulating-bushings *v* for the admission of the electric cables or conductors.

To the casing A is bolted or otherwise secured the base-plate C, of soapstone, vulcanized fiber, or other insulating material, upon which the terminals are mounted. The terminals S B receive, respectively, the positive and negative conductors leading from the switchboard of the lighting-circuit on the car or train. The terminals C H receive, respectively, the positive and negative conductors leading from the dynamo or other charging source. The terminals R receive, respectively, the positive and negative conductors leading from a secondary battery, and the terminals L receive the corresponding terminals leading from another secondary battery. All of these terminals are stationary and are spaced apart and are insulated from each other by the base-plate C. I prefer to construct them of brass blocks or standards *c*, having binding-posts *d* for the conductors and having lugs with anchoring-screws to afford substantial basal support. The blocks *c* are slitted for the reception of the copper clips *e*, whose inner ends are secured within the slits, so as to be firmly held therein.

To connect up the terminals in the manner desired, I provide a series of metallic pieces *f g h* and mount them upon an oscillatory support, so that when shifted to the limit of their throw in one direction they will occupy the position shown in Fig. 1 and when shifted to the limit of their throw in the opposite direction they will occupy the position shown in dotted lines in Fig. 3, these positions or adjustments corresponding, respectively, to the "charging" and "discharging" adjustments.

The oscillatory support for the bridge-pieces preferably consists of two metallic disks $i\ j$, having raised annular rims, against which rest the rings $k\ l$, of hard rubber or other insulating material. The bridge-pieces are clamped between the rings $k\ l$ by means of screws $m$, which at their passage through said bridge-pieces are insulated therefrom by the hard-rubber washers $n$, as indicated in Fig. 2.
The disk $j$ is provided with operating-handles $o$, a stud $p$, of insulating material, serving to limit its throw in opposite directions. The bridge-pieces are provided with tongues or blades whose upper and lower sides are carefully and uniformly turned (in a lathe after the bridge-pieces are clamped in place) so as to enter with slight but sufficient friction the space between the upper and lower members of the spring-clips of the terminals. The disks $i$ and $j$, with their attached parts, are mounted with slight friction to oscillate upon the stationary pin $r$, having the clamping-nut $s$ and integral or fixed collar $t$ for supporting it rigidly from the base-plate C.
On reference to Fig. 3, wherein the outline of the bridge-pieces is indicated by dotted lines, it will be noted that the bridge-piece $f$ is provided with two blades and that the bridge-pieces $g$ and $h$ are each provided with three blades. A consideration of said figure will also show that in the adjustment therein indicated the charging-terminals are entirely disconnected, the plus-terminals of the batteries and switchboard connected, and the minus-terminals of the batteries and switchboard connected, thereby putting the batteries in parallel with each other and across the lighting-circuit, as is desired in coupling them up for use. When the batteries require charging, the entire switch (by which I mean the disks and their adjuncts) is oscillated into the adjustment indicated in Fig. 1, whereupon the switchboard-terminals are entirely disconnected and the batteries are put in series with each other and with the charging-dynamo.

It will be apparent that by oscillating the switch to an adjustment intermediate between the charging and discharging position all of the bridge-pieces will break contact with the terminals, and consequently all of the terminals will be disconnected. The slight friction with which the switch turns upon its center pin permits it to remain in this position when desired.

The box or casing A is provided with a cover B, hinged at $x$ and adapted to be held when closed by means of swing-bolts $q$, which engage between lugs $w$ and carry lock-nuts, as shown. On the inner side of the cover is mounted a wooden block $z$, so located thereon as to prevent the cover from being closed except when the switch is in the discharging position. At all other positions of the switch the block $z$ comes in contact with one of the handles $o$ if an attempt is made to close the cover. The operator must therefore oscillate the switch fully into the discharging position, thereby taking the corresponding handle out of the path of the block $z$ before the cover can be closed. The arrangement is such, moreover, that the block $z$ just clears the handle when the cover is closed, and the block therefore serves as a safeguard or stop to prevent accidental retrogression or shifting of the switch after it has been set, and thus locked in the discharging adjustment.

Having thus described my invention, what I claim is—

1. A junction-switch for secondary-battery distribution systems, consisting of a pair of terminals for each secondary battery employed, a pair of terminals for the charging source and a pair of terminals for the distribution-circuit, in combination with a normally stationary shiftable switch having bridge-pieces so disposed with relation to the terminals that in one position of adjustment the secondary batteries will be put in series with each other and with the charging source while the terminals of the distribution-circuit will be disconnected, and, when in another position of adjustment, the batteries will be put in parallel with each other and across the distribution-circuit and the charging-terminals will be disconnected and means for setting the bridge-pieces into either of said positions with respect to the terminals; substantially as described.

2. A junction-switch for secondary-battery systems comprising a pair of terminals for each of the secondary batteries employed, a pair of terminals for the charging source and a pair of terminals for the distribution-circuit, said pairs of terminals being arranged in a circular series, in combination with a centrally-disposed normally stationary shiftable switch-plate carrying bridge-pieces, so spaced with reference to the terminals that in one position of adjustment they will place the batteries in series with each other and with the charging source, and, in another position of adjustment, they will place the batteries in parallel with each other and across the distribution-circuit and means for setting the switch-plate into either of said positions to bring the bridge-pieces and terminals into the relations specified or into an intermediate position with all the terminals disconnected, substantially as described.

3. A junction-switch for secondary-battery systems, comprising a pair of terminals for each of the secondary batteries employed, a pair of terminals for the charging source, and a pair of terminals for the distribution-circuit, said pairs of terminals being arranged in a circular series, in combination with a centrally-disposed shiftable switch-plate carrying bridge-pieces, so spaced with reference to the terminals that in one position of adjustment they will place the batteries in series with each other and with the charging source, and, in another position of adjustment, they will place the batteries in parallel with each other and across the distribution-circuit, and a box within which the terminals and switch-plate are mounted, said box being provided with a cover constructed and arranged to close when the switch-plate is in the latter position of adjustment only; substantially as described.

4. A junction-switch comprising outlying terminals and a central shiftable plate carrying bridge-pieces adapted to coöperate with said terminals, said switch-plate being mounted upon a stud and consisting of disks between which the bridge-pieces are clamped, insulating material interposed between the disks and bridge-pieces and means for securing the bridge-pieces and insulating material between the disks; substantially as described.

5. A junction-switch comprising outlying terminals and a central shiftable plate carrying bridge-pieces adapted to coöperate with said terminals, said switch-plate being mounted upon a stud and consisting of disks between which the bridge-pieces are clamped, insulating material placed between the disks and bridge-pieces one of said disks having operating-handles and means for securing said disks together; substantially as described.

6. A junction-switch box comprising a casing containing outlying terminals and a central oscillatory switch-plate having operating-handles, a stop for limiting the throw of the plate in opposite directions and a cover for the box and means to prevent the closing of the cover until after the switch has been moved to one limit of its throw; substantially as described.

7. A junction-switch, comprising a casing containing an insulating-base, a series of terminals arranged in circular order upon said base, a central oscillatory switch-plate carrying bridge-pieces, having tongues or blades adapted to make contact with clips projecting from the terminals, said switch-plate having operating-handles, a stop for limiting the throw of the switch-plate in opposite directions, and a cover having a projection on its inner side, said projection being in the path of retrogression of the switch-plate when the cover is closed, thereby locking the switch-plate in position; substantially as described.

8. A junction-switch box containing a series of terminals, together with a shiftable switch therefor, said box being provided with a cover and means to prevent the closing of the cover until after the switch has been moved to the desired position; substantially as described.

9. A junction-switch box containing a series of terminals, together with a shiftable switch therefor, said box being provided with a cover constructed and arranged to close the box only after the switch has been moved to the desired position of adjustment, and having a projection in the path of retrogression of the switch when the cover is closed; substantially as described.

In testimony whereof I affix my signature in presence of two witnesses.

MONTGOMERY WADDELL.

Witnesses:
JOHN C. PENNIE,
DANIEL W. EDELIN.